United States Patent [19]

Bergheim et al.

[11] Patent Number: 4,722,633

[45] Date of Patent: Feb. 2, 1988

[54] COMPOUND JOINT AND METHOD FOR ITS PRODUCTION

[76] Inventors: Hans Bergheim, Am Wichelshof 34; Winfried Griep, Kirschfeldstr.1, both of D-5300 Bonn 1, Fed. Rep. of Germany

[21] Appl. No.: 882,099

[22] Filed: Jul. 3, 1986

[51] Int. Cl.⁴ .............................................. B25G 3/28
[52] U.S. Cl. ................................... 403/277; 403/248; 403/5
[58] Field of Search .................. 403/5, 285, 277, 248; 29/523, 507; 52/586

[56] References Cited

U.S. PATENT DOCUMENTS

| | | | |
|---|---|---|---|
| 2,644,553 | 7/1953 | Cushman | 403/5 |
| 2,754,573 | 7/1956 | Schoessow | 29/523 UX |
| 3,363,386 | 1/1968 | Elflein et al. | 52/586 |
| 3,771,277 | 11/1973 | Rausch et al. | 52/586 X |
| 3,780,481 | 12/1973 | Tomkins | 52/586 X |
| 4,389,589 | 6/1983 | Schustek | 29/523 X |
| 4,532,747 | 8/1985 | Koetje | 29/507 X |

Primary Examiner—Andrew V. Kundrat
Attorney, Agent, or Firm—Darby & Darby

[57] ABSTRACT

Disclosed herein is a compound joint in which a lower section and an upper section are mated along a common contact plane. Means for positively interlocking the sections are provided in each section. A depressed area on the surface of each of the sections is oriented along the common contact plane, such that when the sections are interlocked, the depressed areas form an enclosed tube. A spreader tube can be positioned within the enclosed tube, whereby the expansion of the spreader tube within the enclosed tube to a volume larger than the volume of the enclosed tube causes said interlocked sections to be permanently joined.

10 Claims, 6 Drawing Figures

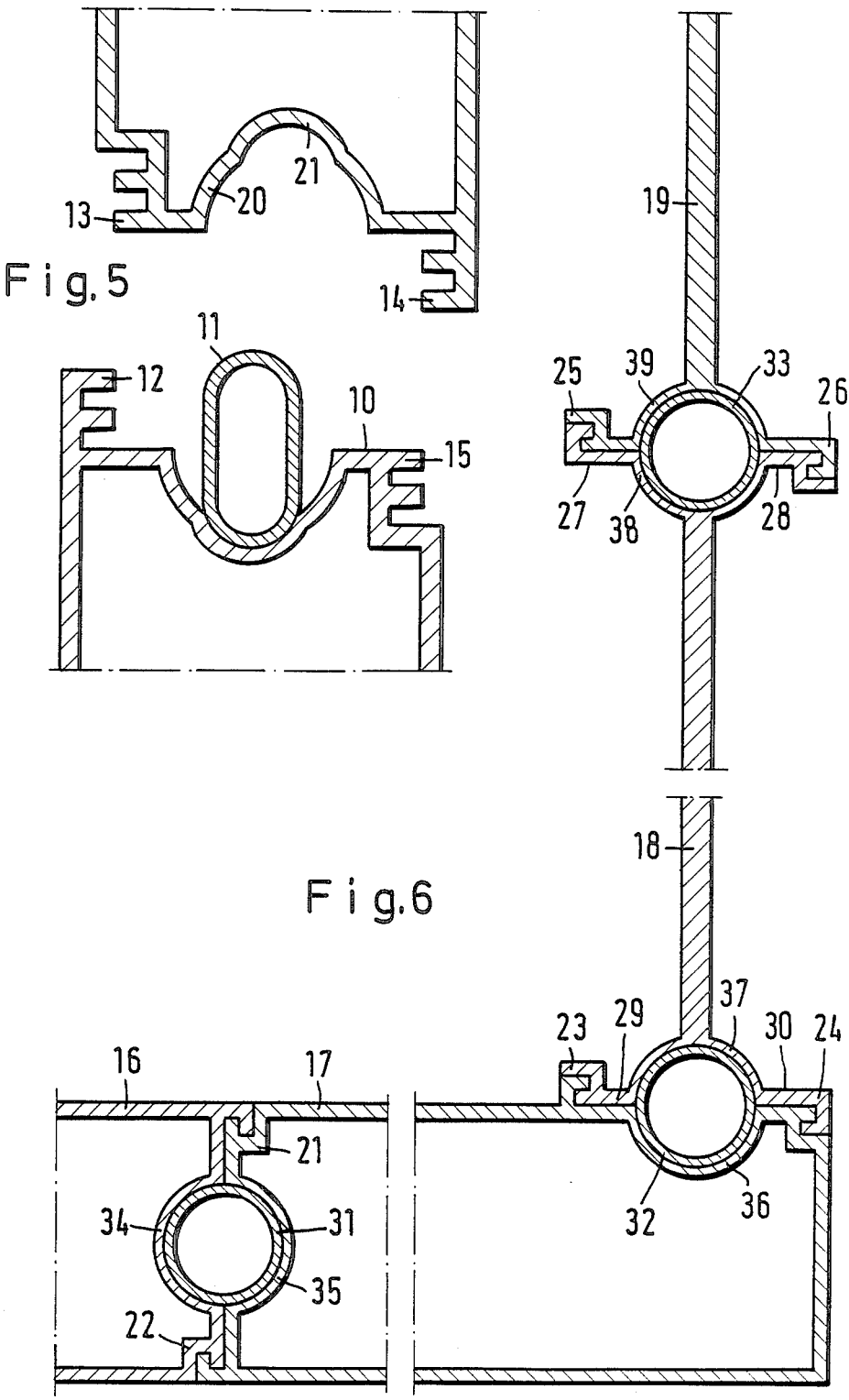

COMPOUND JOINT AND METHOD FOR ITS PRODUCTION

FIELD OF THE INVENTION

The present invention relates to a compound joint and more particularly, to a joint consisting of at least two separate sections which are joined together longitudinally.

BACKGROUND OF THE INVENTION

The clamping together of composite sections, with C-shaped grooves on their longitudinal side to form a compound joint, in particular of metal, is known. This type of joint is used in the manufacture of several types of products including window frames, cargo sections of trucks, and vehicular chassis. This type of union cannot transmit shear or thrust forces in the longitudinal direction. Often, additional techniques such as adding fasteners, using adhesives, or crimping to increase the strength of the joint and allow the union to transmit shear or thrust forces in the longitudinal direction are employed in constructing such a joint.

These additional techniques have various disadvantages. The use of additional fasteners such as screws causes weakening of the joint due to the removal of material by machining. In order to use adhesives, very clean surfaces and considerable drying times must be provided. Crimping the joint requires additional expensive machining. For certain section forms, particularly those with concealed contact faces, these additional joining techniques can only be carried out with great difficulty.

It is an object of the present invention to avoid these disadvantages and to provide composite elongated sections for forming a compound joint as well as a method for the joining of sections, which makes possible a simple, high-strength union of elongated sections, particularly at inaccessible contact faces.

SUMMARY OF THE INVENTION

The present invention is directed to a compound joint including a lower section and an upper section having a common contact plane with the lower section. Interlocking means for positively interlocking the sections are provided. A groove within each of the sections is oriented along the common contact plane. When the sections are interlocked, the grooves form an enclosed tube. A spreader tube can be positioned within the enclosed tube, whereby the expansion of the spreader tube within the enclosed tube to a volume larger than the volume of the enclosed tube causes said interlocked sections to be permanently joined.

BRIEF DESCRIPTION OF THE DRAWINGS

FIG. 5 is a cross-sectional view of another embodiment of the present invention.

FIG. 6 is a cross-sectional view showing several arrangements of compound joints.

DETAILED DESCRIPTION OF THE INVENTION

Figure 1:
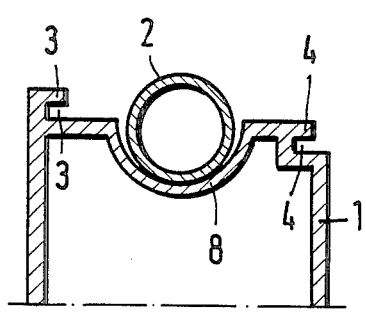
FIG. 1 is a cross-sectional front view of a first section of the compound joint of the present invention.
Figure 2:
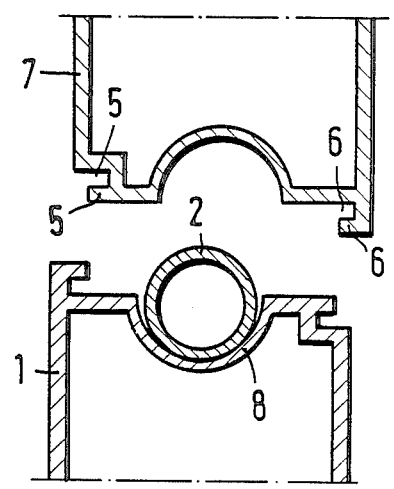
FIG. 2 is a cross-sectional front view showing a second section of the compound joining in proximity to the front section.

In FIGS. 1-4 a lower first metal elongated section 1 is shown. The top 40 of section 1 is the joint mating surface.

Top surface 40 includes a central, longitudinal cradle 8. The cradle is semi-cylindrical in shape. Top surface 40 includes at its edges a pair of longitudinal receiving grooves 3 and 4. The receiving grooves are generally C-shaped in cross section. In the embodiment shown in FIGS. 1-4 receiving groove 3 is formed by adding the upper portion of a "C" above top surface 40. Receiving groove 4 is formed by indenting the side wall of lower section 1 such that the top portion of the "C" is formed from top surface 40. The open end of both receiving grooves 3 and 4 face in the same direction, i.e., to the right in FIG. 1. However the top surface 40 forms the floor of one receiving groove 3 and the top of the other receiving groove 4.

An upper elongated section 7 is formed to mate with lower section 1. Section 7 has a top surface 41 which is the joint mating surface and includes a central semi-cylindrical cradle 9. Section 7 also includes two receiving grooves 5 and 6. These grooves are "C-shaped" and are formed in a like manner as grooves 3 and 4 of lower section 1. The open end of grooves 5 and 6 face in the same direction, i.e., to the left in FIG. 2. The open ends of grooves 5 and 6 in upper section 7 face in the opposite direction and away from the open ends of grooves 3 and 4 in lower section 1.

Figure 3:
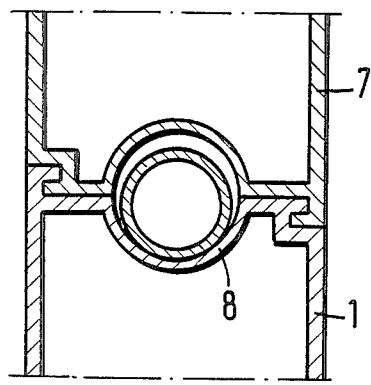
FIG. 3 is a cross-sectional front view of the first and second sections joined to each other.
Figure 4:
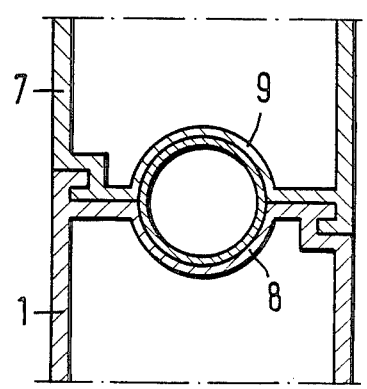
FIG. 4 is a cross-sectional front view of the joined first and second sections and an expanded spreader between the two sections.

An inner spreader tube 2 is placed along the semi-cylindrical cradle 8 of lower section 1. Inner spreader tube 2 has a radius less than the radius of semi-cylindrical cradle 8. With spreader tube 2 in position and coaxially aligned within semi-cylindrical cradle 8, upper section 7 is mated to lower first section 1 by inserting the protruding portions of the "C" of receiving grooves 5 and 6 into the open ends of grooves 3 and 4. The mated sections 1 and 7 are shown in FIG. 3. The joining of sections 1 and 7 forms a cylinder between the two top surfaces 40 and 41 of sections 1 and 7. The cylinder is formed by alignment of cradles 8 and 9. The diameter of the cylinder formed is greater than the diameter of spreader tube 2 which is coaxially aligned with and within the cylinder.

To tighten the compound joint formed by interlocking lower section 1 with upper section 7, spreader tube 2 is radially expanded to fill the cylinder volume between the compound joint. Spreader tube 2 is expanded radially to the point of extending the cylinder slightly. The radial expansion is performed while the spreader tube 2 is within the cylinder formed by cradles 8 and 9. The force of expansion of spreader tube 2 causes the interlocking C-shaped grooves to become tightly clamped due to the opposing forces provided by the radial expansion of the spreader tube 2.

The arrangement of the C-shaped receiving grooves, each pair facing the same direction, and the provision for the cylinder formed by semi-cylinder 8 and 9 having a radius larger than the radius of spreader tube 2 allows lower section 1 and upper section 7 to be interlocked while spreader tube 2 is in position within the cylinder joined by cradle 8 and cradle 9. The larger volume of cylinder joined by opposed cradles 8 and 9 allows the lower and upper sections 1 and 7 to be maneuvered into an interlocked position even when spreader tube 2 is resting within semi-cylindrical cradle 8.

In order to form an effective compound joint, first section 1 and second section 7, and spreader tube 2 must be formed from a suitable material. Spreader tube 2 must be made from a hard material, preferably an aluminum alloy containing aluminum, magnesium and silicon which undergoes cold work hardening during expansion. An alloy containing 0.3–0.6% Si; 0.35–0.6% Mg; and balance Al is suitable. An alloy containing 0.7–1.3% Si; 0.6–1.2% Mg; balance Al, is preferred for greater hardness.

The semi-cylindrical cradle portions 8 and 9 of sections 1 and 7 should be made from a soft and readily deformable material such as an aluminum alloy with copper and magnesium. For some applications, such as in heating systems, it may be desirable to use spreader tubes of pure copper or of steel alloys (e.g., 0.10% C; 17.0–19.0% Cr; 9.0–11.5% Ni; balance Fe) where brazing or welding is desired. Suitable alloys include: AlZn 4.5 Mg 1 (0.1–0.2% Cu; 4.0–5.0% Zn; 1.0–1.4% Mg; 0.05–0.5% Mn; balance Al); AlZnMgCu 1.5 (1.2–2.0% Cu; 5.5–6.5% Zn; 2.1–2.9% Mg; balance Al); and AlZn8MgCu (1.2–1.9% Cu; 2.1–3.1% Mg; 7.2–8.4% Zn; balance Al). Other alloys can be used.

Expansion of the spreader tube 2 is accomplished using a mandrel which is drawn through spreader tube 2. The mandrel is of sufficient oversize to expand spreader tube 2 to the point of slightly deforming and expanding the cylinder formed by semi-cylindrical cradles 8 and 9. After the spreader tube 2 has been expanded, the compound joint is firmly, securely and permanently joined. The compound joint formed can absorb shear or thrust forces of at least 20 t/m (tons per meter) in the longitudinal direction (for a cylindrical joint having a wall thickness of 2.5 mm and an inner diameter of 28 mm; and for an alloy containing 0.3–0.6% Si; 0.35%–0.6% Mg; and balance Al).

It is important that the C-shaped receiving grooves forming the interlock be arranged diametrically relative to the center axis passing through the cylinder formed by semi-cylindrical cradles 8 and 9. In this manner, unequal stress of the compound joint can be prevented.

The wall thickness of semi-cylindrical cradles 8 and 9 can be thinner than the wall thickness of lower section 1 or upper section 7 at receiving grooves 3 and 4 or 5 and 6 because expansion is easier when a thinner wall thickness is used. Strength is maintained by rigid arrangement of the expanding tube in the semi-cylindrical cradles.

FIG. 5 shows an alternative embodiment of the present invention. A spreader tube 11 is provided showing an oval cross section with a vertical axis perpendicular to the contact face 10 of the lower section. This arrangement is useful because it is possible to interlock the upper and lower sections even with narrow upper and lower sections while spreader tube 11 is inserted between the two sections. This embodiment is also useful for use with sections having wide interlocking grooves 12-15. Cradle 20 is provided with an additional depression 21 which facilitates a vertical (perpendicular) arrangement of spreader tube 11. FIG. 5 also shows an alternative arrangement of interlocking grooves 12-15. The C-shaped grooves shown in FIGS. 1-4 have been replaced with E-shaped grooves. This arrangement allows twice as many tongue and groove interlockings as a C-shaped arrangement. Consequently, the resulting compound joint can withstand higher stresses.

FIG. 6 shows the connection of four metal sections 16-19. These are chamber sections 16, 17 and one-bar sections 18, 19, the interlock being illustrated for sections of the same kind as well as for different section types. In contrast to E-shaped grooves 12-15 as shown in FIG. 5, here C-shaped grooves 21-26 are used. These grooves may be arranged at the groove bars 27-30 for absorption of greater bending movements. This applies in particular for the single-bar separate sections 18, 19.

It is important that the C-shaped grooves 21-26 be arranged diametrically relative to the center axis passing through the segments 34, 35 or 36, 37 or 38, 39). This means that the C-shaped grooves should be diametrically opposed to one another, i.e. facing 180° apart relative to the center axis of the cylinder formed by the cradles. This arrangement prevents unequal stress at the union of the separate sections, which can cause failure of the joint. Minor dimensional deviations (e.g., manufacturing tolerances) can be compensated for by the spreading action of the inner tubes 31-33.

What is claimed is:

1. A compound joint comprising:
   a lower section;
   an upper section having a common contact plane with said lower section;
   interlocking means on each said upper and lower sections for positively interlocking said sections;
   a depression on each of said sections, said depression having a wall thickness thinner than the wall thickness of said upper and lower sections at the remainder of said common contact plane, said depression oriented along said common contact plane such that when said sections are interlocked, said depression forms an enclosed tube; and
   a spreader tube for positioning within said enclosed tube, whereby the expansion of said spreader tube within said enclosed tube to a volume larger than the volume of said enclosed tube causes said interlocked upper and lower sections to be permanently joined.

2. The compound joint of claim 1 wherein said interlocking means comprises a pair of parallel C-shaped segments at said lower sections and a corresponding opposing pair of parallel C-chaped segments at said upper section.

3. The compound joint of claim 2 wherein said depression is located on the upper surface of each of said sections and between said interlocking means.

4. The compound joint of claim 2 wherein the periphery of said spreader tube is in contact with the surface of the depressions on said upper and lower sections.

5. The compound joint of claim 2 wherein said spreader tube comprises a hard metal and said depressions comprise a relatively soft deformable metal.

6. The compound joint of claim 5 wherein said metal comprises aluminum.

7. The compound joint of claim 1 wherein said interlocking means are oriented diametrically opposite the center axis of said enclosed tube.

8. The compound joint of claim 1 wherein said interlocking means comprises a pair of parallel E-shaped segments at said lower section and a corresponding opposing pair of parallel E-shaped segments at said upper section.

9. The compound joint of claim 1 wherein said depression has a semi-cylindrical shape and said enclosed tube is cylindrical.

10. The compound joint of claim 1 wherein the cross section of said groove is semi-oval and the cross section of said enclosed tube is oval.

* * * * *